I. M. CHRISCO.
CORN PLANTER.
APPLICATION FILED DEC. 20, 1913.
1,126,393.
Patented Jan. 26, 1915.
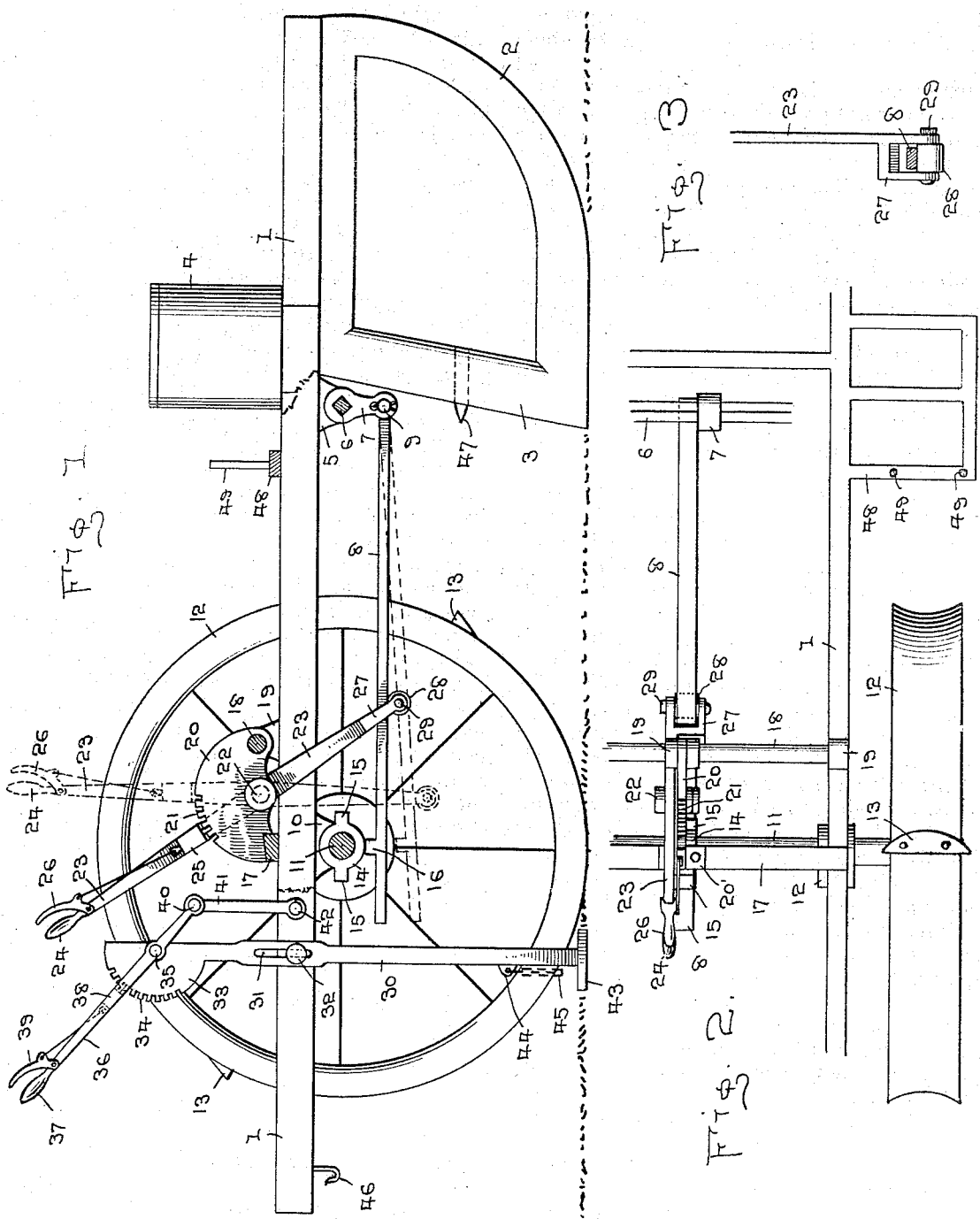
Witnesses
Thos. W. Riley
J. H. Reid.
Inventor
I. M. Chrisco
By W. J. Fitzgerald & Co.
Attorneys

UNITED STATES PATENT OFFICE.

ISRAEL MONROE CHRISCO, OF BARTLETT, MISSOURI, ASSIGNOR OF ONE-FOURTH TO WILLIAM ALEXANDER RAMSEY AND ONE-FOURTH TO DAVID MEEKER, BOTH OF BIRCH TREE, MISSOURI.

CORN-PLANTER.

1,126,393.  Specification of Letters Patent.  Patented Jan. 26, 1915.

Application filed December 20, 1913. Serial No. 807,923.

*To all whom it may concern:*

Be it known that I, the undersigned, ISRAEL MONROE CHRISCO, a citizen of the United States, residing at Bartlett, in the county of Shannon and State of Missouri, have invented certain new and useful Improvements in Corn-Planters; and I do hereby declare the following to be a full, clear, and exact description of the invention, such as will enable others skilled in the art to which it appertains to make and use the same.

My invention relates to corn planters and more particularly to those known as wireless checkrow planters, and has for one of its objects the provision of an actuating rod of simple construction, effective in its operation and thereby dispensing with the necessity for the cumbersome mechanism now in use.

A further object of my invention is the provision of means for elevating one of the master wheels for arranging the same in operative position at the initial start of the planting operation or when necessary to line up in the field.

A still further object of my invention is the construction of means for efficiently throwing the actuating means into and out of operative engagement.

A still further object of my invention is the provision of means for marking the ground where corn has been planted for the purpose of starting the row, keeping in the row and regaining the check row in case of being thrown off in the field. And a still further object of this invention is the arrangement and construction of the parts thereof, whereby the same may be readily and effectively attached to any planter now in use and without requiring any changes or alterations in the machine to which my invention is to be attached.

These and other objects will more fully appear and the nature of the invention be more clearly understood by the construction, combination and arrangement of the parts as described in the following specification, defined in the appended claims and illustrated in the accompanying drawings, in which, Figure 1 is a side elevation of a corn planter, the right hand master wheel being removed, showing my invention in its operative position upon the same. Fig. 2 is a top fragmentary view of the right side of a planter, showing the right master wheel attached thereto. Fig. 3 is a front view of the lower end of the operating lever, showing the construction of the same and its relative relation to the actuating bar.

I deem it expedient to here state that only a sufficient portion of a corn planter has been shown in the drawings for fully illustrating the application of my invention to a corn planter, and for the sake of clearness and convenience.

Like reference characters denote similar parts throughout the several views of the drawings, reference being had to the same; 1 denotes the frame of a corn planter, and 2 the furrower of the machine, and also arranged upon the bottom of frame 1 and at the rear of the furrower 2 is the drill 3. Mounted upon the frame 1 is the usual corn hopper 4 positioned above the drill 3 in the usual manner. Arranged upon the bottom of the frame 1 are the brackets 5, in which is rotatably mounted the check bar 6, and upon this bar is the rocker arm 7 and upon the free end of the rocker arm is pivotally connected the actuating bar 8 and secured to the rocker arm 7 by the key bolt or other suitable connection 9.

Arranged upon the frame 1, and adjacent the rear portion thereof, are the journal boxes or brackets 10 through which the axle 11 is adapted to revolve, and fixedly connected to the end of the axle 11 and at the right side of the frame 1 is the master wheel 12 having arranged upon the periphery thereof the markers 13, positioned thereon in diametrically opposed relation to each other. Rigidly mounted upon the axle 11, and at a point remote from the master wheel 12 and within the frame 1, is the tappet wheel 14, provided with the tappets 15 adapted for engagement with the lug 16 arranged upon the actuating rod 8, for operating the same. The tappets 15 and the markers 13 are so positioned relative to each other that the markers 13 will accurately mark the ground at the corn hill.

Mounted upon the brace bar 17 of the frame 1 and the gear rod 18, which is journaled in the brackets 19, is the semicircular rack bar 20, provided with the teeth 21 for a part of the periphery, and at the medial central portion of the rack 20 and upon the pivot 22 thereat is mounted the operating lever 23, the lever being arranged upon the pivot 22 approximately intermediate of its ends, the lever 23 being provided with the handle 24, the spring pressed pawl 25 for engaging the teeth 21, and a finger piece 26 for operating the pawl 25. The lever 23 is also provided at the lower end thereof with the yoke 27 having the roller 28 positioned between the extremities of the yoke 27 and adapted to revolve upon the bolt 29, the yoke member being of sufficient length to provide ample space between the surfaces of the roller 28 and the head of the yoke 27 to permit the bar 8 to freely pass therebetween and adapted to travel upon the antifrictional roller 28 during the operation of the actuating bar. Also arranged upon the right side of the frame 1 and in proximity to the master wheel 12 and rearwardly of the axle 11, is the bar 30 provided approximately the central portion thereof with the elongated slot 31, the bar 30 being pivotally mounted upon the frame 1 through the medium of the pin 32 and upon which the bar 30 is adapted to swing and to travel vertically thereon, through the means of the slot 31, and arranged upon the upper end of the bar 30 is the segmental rack 33, provided with the teeth 34, and upon which rack is arranged a pivot 35, upon which the lever 36 is adapted to revolve, the lever 36 being also provided with the handle 37, the spring actuated pawl 38 and the usual finger piece 39 for actuating the pawl. The lever 36 is pivoted to the rack 33 at a point slightly remote from the lower end thereof and is provided at the free end with the pivotal connection 40, into which is mounted the link 41, the opposite end of the link 41 being pivotally mounted upon the frame 1 by the pivot 42, the pivot 42 being adjacent to the pivot 32 whereby the bar 30 and the link 41 are sustained in parallel relation to each other when the bar 30 is set to operative position. Arranged at the lower end of the bar 30 is the base plate 43 and also upon the bar 30 and above the base plate 43 is the ear 44 to which is attached the chain 45 adapted for engagement with the hook 46 arranged upon the rear portion of the frame 1 for holding the bar 30 and the base plate 43 in elevated position under the frame of the machine when the same is not in use.

Mounted upon the bar 48 of the main frame 1 are the sighting pins 49 arranged in slightly spaced relation to each other and each being positioned in a manner to permit the line of vision to pass between the same at the initial starting of the machine or when thrown off row during the planting for alining the same for the accurate planting of the rows of corn.

Upon the drill 3, I arrange an indicator 47 at a convenient point upon the same, preferably at the central portion of the drill, for the purpose of providing a point for accurately determining the position of the master wheel 12 when setting the machine at the end of the rows or when out of line in the field and which indicator provides a fixed point with which one of the markers 13 of the master wheel 12 is to register in such manner that a horizontal plane passing through the indicator 47 also passes through one or other of the markers on the side of the wheel nearest said indicator thus determining the beginning of the dropping operation for spacing the hills of corn at a predetermined distance apart.

The many advantages of my invention will be more clearly understood by the operation of the same as follows: Assuming the planter as set for the initial start, one of the markers 13 being in registration with the indicator 47, the operating lever 23 being in position shown in full lines in the drawings and in which position the actuating bar 8 is elevated in order that the lug 16 of the same is in the path of movement of the tappets 15 of the tappet wheel 14, the frame 1, together with the master wheel 12, being lowered by the forward movement of the lever 36, each of the respective levers 23 and 36 being held in immovable position by the engagement of the spring pressed pawls 25 and 38 of the respective levers fixedly engaging the teeth 21 and 34 of the respective segmental racks 20 and 33, the master wheel 12 now being in contact with the surface of the ground, the planter is now in condition for operation, as the same is advanced the rotation of the master wheel 12 being fixedly connected to the axle 11 necessarily revolves the same and at the same time the tappet wheel 14 is revolved by the axle 11, and upon such movement of the tappet wheel the tappets 15 are alternately brought into engagement with the lug 16, thereby forcing the actuating bar 8 rearwardly, this movement rocking the rocking arm 7, causes the check rod 6 to slightly rotate and through its connections (not shown) with the corn box 4, will cause the grain to be dropped in the hills at the desired distance apart and opposite the points previously marked by the markers 13 arranged upon the periphery of the master wheel 12. When the trip has been completed at the far end of the field, it is now necessary to reset the machine for the return trip and this is done by depressing the lever 36 and setting the pawl in the lowermost teeth of the rack 33 which downward movement of the lever 36 elevates the free end thereof, together with the link 41, and the same being attached to the frame 1 at the point 42, necessarily elevates the frame 1 at the right hand side of the machine and at the same time raises the wheel 12 out of contact with the ground. It is to be understood that the lever 23 has been advanced in a forwardly direction, as shown in dotted lines, the spring pressed pawl of this lever being set in the forward teeth of the rack 20, and by this movement the yoke 27 of the lever 23 is carried rearwardly and slightly downwardly, thereby depressing the actuating bar 8, thus causing the lug 16 of the actuating bar to be positioned at a point beyond the path of movement of the tappet 15 of the tappet wheel 14, it being obvious that the machine is now in an inoperative condition, or that it may be termed out of gear, whereupon the master wheel 12 is now capable of being freely rotated without affecting any of the working parts of the planter and can be readily positioned wherein one or the other of the markers 13 register with the indicator 47, and after the completion of this operation the machine is then reset in the manner as stated in the beginning of the operation, and after the machine has been accurately alined with the rows previously indicated by the markers 13 through the medium of the sighting means 49.

The bar 30, when not needed for elevating the frame and the master wheel of the machine, is adapted to be swung rearwardly and upwardly and retained in such elevated position by the engagement of the chain 45 with the hook 46, the component parts of the bar 30 being obviously arranged for permitting this movement.

While I have here shown and described the master wheel provided with only two markers and the tappet wheel with only two tappets thereon, I desire it to be understood that I do not limit my invention to this exact construction, as the master wheel may be provided with any number of markers as well as the tappet wheel also provided with any number of tappets thereon, the dimensions of either or both being of such character to meet the exigencies of the case.

I have here shown and described the preferred embodiment of my invention, but I hereby reserve the right to make such alterations and variations therein as I may deem expedient, and which do not depart from the spirit of this invention or conflict with the scope of the claims.

Having thus described my invention, what I claim as new and desire to secure by Letters-Patent of the United States is:

1. In a corn planter, the combination with a main frame thereof, a hopper supported thereon, said hopper containing seeding means, an axle supporting said frame, a drill also arranged upon said frame beneath said hopper, a check bar for operating said seeding means, means for actuating said check bar, means arranged upon said axle for operating said actuating means, and means mounted upon said frame controlling said last mentioned means, including a vertical segmental rack and a lever mounted upon said rack, the lower end of said lever being formed with a yoke and carrying a roller on which said actuating means for the seeding mechanism is adapted to work.

2. In a corn planter, in combination with the main frame thereof, a hopper carried by said frame, said hopper containing a seeding mechanism, an axle supporting said frame, a drill also arranged upon said frame beneath said hopper, a check bar for operating said seeding mechanism, a master wheel rigidly secured to said axle for rotating the same, a tappet wheel also secured to said axle and adapted to rotate therewith, means for translating the rotary motion of said tappet wheel into oscillating motion for said check bar, and means for controlling said translating means including a vertical segmental rack and a lever mounted upon said rack the lower end of said lever being formed with a yoke and carrying a roller on which said translating means are adapted to work.

3. In a corn planter, the combination with the main frame thereof, a hopper carried by said frame, said hopper containing a seeding mechanism, an axle supporting said frame, a drill also arranged upon said frame beneath the said hopper, a check bar for operating said seeding mechanism, means for actuating said check bar, means arranged upon the axle for operating said actuating means, means mounted upon said frame for controlling said actuating means, a master wheel rigid with said axle for revolving the same and said operating means, markers arranged upon said master wheel, and means arranged upon said drill for indicating the correct alinement of said master wheel and said markers.

4. In a corn planter the combination with a main frame thereof, a hopper carried by said frame, said hopper containing a seeding mechanism, an axle supporting said frame, a drill also arranged upon said frame beneath said hopper, a check bar for operating said seeding mechanism, a master wheel rigid with said axle for revolving the same, markers arranged upon the master wheel and means arranged upon said drill for indicating the correct alinement of said master wheel and said markers, a tappet wheel also rigid with said axle and revolving therewith, means for translating the rotary motion of said tappet wheel into oscillatory motion for said check bar and means mounted upon the frame for throwing said translating means in or out of operative position.

In testimony whereof I have signed my name to this specification in the presence of two subscribing witnesses.

ISRAEL MONROE CHRISCO.

Witnesses:
JESSE L. WEBB,
WILLIAM N. DEATHERAGE.